March 20, 1962  J. O. BROWN ET AL  3,025,900
VEHICLE WHEEL TIRE CHAIN ASSEMBLY
Filed Sept. 8, 1960  2 Sheets-Sheet 2
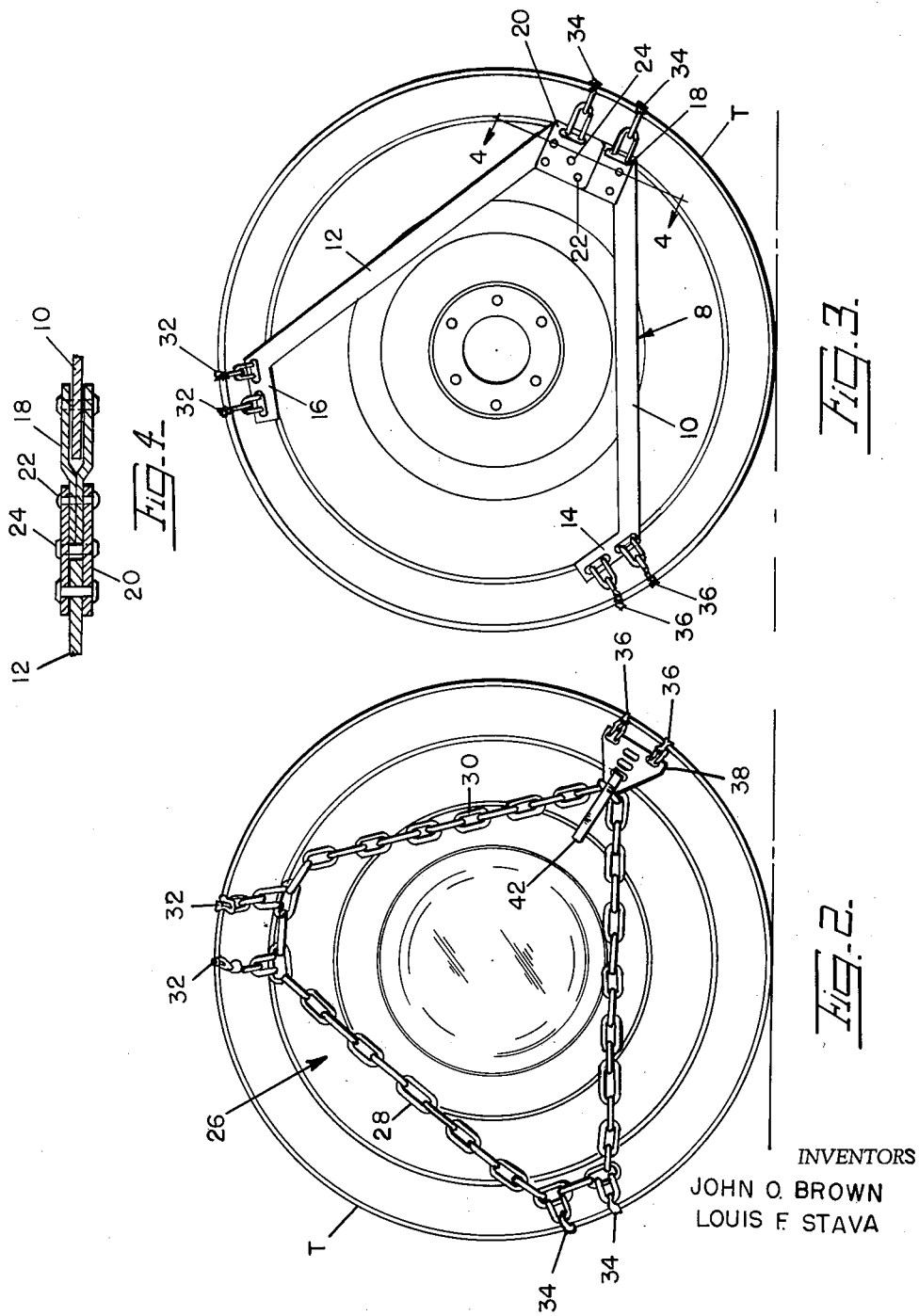
INVENTORS
JOHN O. BROWN
LOUIS F. STAVA

United States Patent Office 3,025,900
Patented Mar. 20, 1962

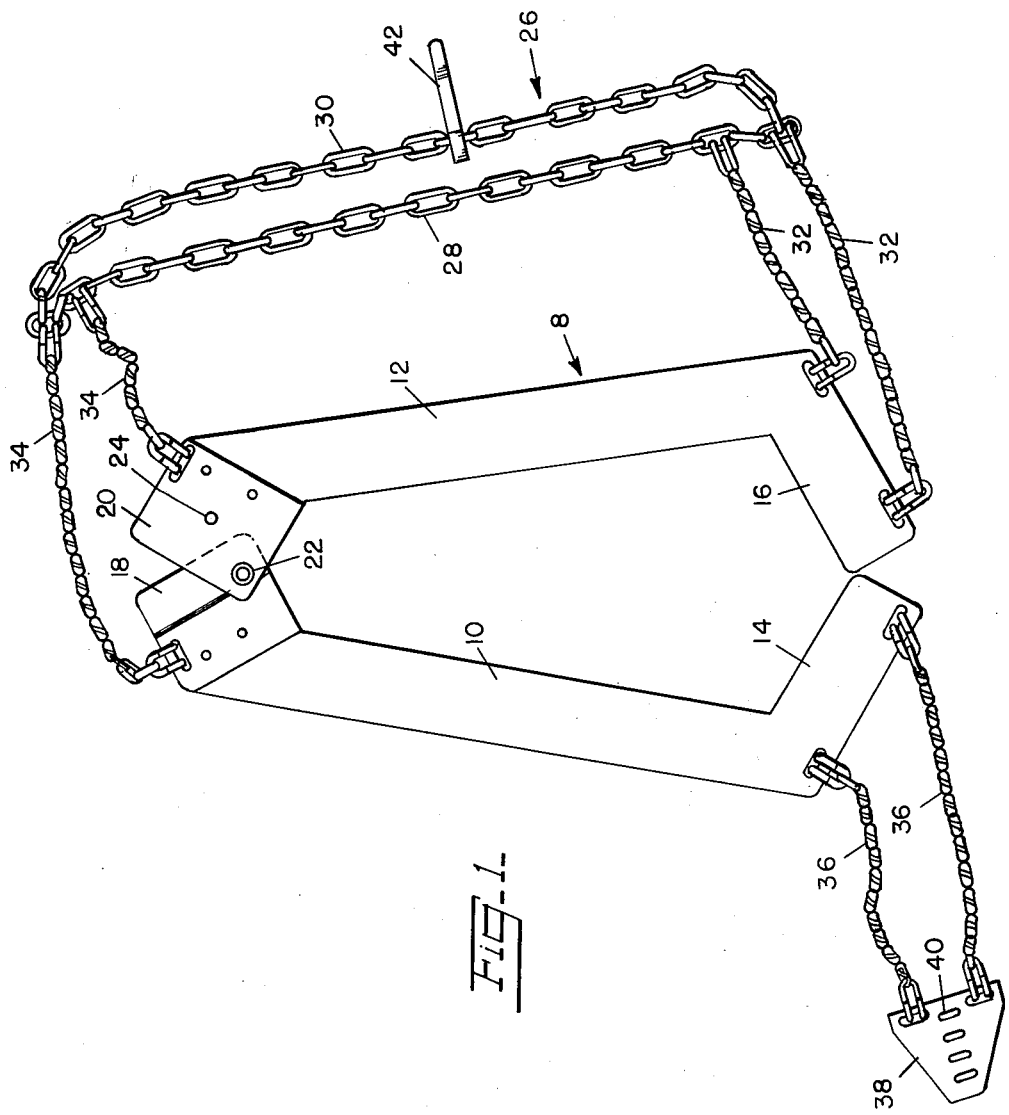

3,025,900
VEHICLE WHEEL TIRE CHAIN ASSEMBLY
John O. Brown, 110 E. 2nd St., and Louis F. Stava,
439 A St., both of Wahoo, Nebr.
Filed Sept. 8, 1960, Ser. No. 54,790
5 Claims. (Cl. 152—213)

The present invention relates to improvements in vehicle wheel tire chain assemblies and is concerned more particularly with quickly attachable and detachable chains or other anti-skid devices for vehicle tires.

One of the principal objections to the use of tire chains is the difficulty of operatively applying the same to the vehicle wheel tires and it is the general object of the present invention to avoid this objection by providing a tire chain assembly which may be very quickly and securely operatively positioned upon a tire with a minimum of manipulation and effort.

We are aware of various prior art devices which are purported for attachment to a vehicle tire without any rolling movement or elevation of the vehicle wheel and the device of our invention is also capable of attachment upon a stationary tire while at rest upon its supporting surface.

The tire chain assembly of the present invention, however, is a very considerable improvement over such prior art devices in that, instead of being fitted over the vehicle tire, it is adapted for attachment to the vehicle tire by transverse movement with the operator's hands only barely elevated above the tire supporting surface. Actually, the assembly of the present invention may ordinarily be operatively installed upon a vehicle tire in a matter of seconds even when the tire is partially embedded in mud or some other depression. Accordingly, the present tire chain assembly is ideally adapted for use on vehicles having relatively low hanging or depending fenders or fender skirts and it is further ideally adapted for use with any and all types of vehicles in view of its extremely rapid and simple manner of operative attachment.

The foregoing and other objects and advantages will be apparent from the following detailed description taken in conjunction with the accompanying drawings wherein a preferred embodiment of the principles of the invention has been selected for exemplification.

In the drawings:

FIG. 1 is a plan view of a vehicle wheel tire chain assembly embodying the present invention shown with the frame arms in folded or storage position;

FIG. 2 is a side elevational view from the outer face of the vehicle wheel showing the assembly of FIG. 1 installed in operative position over the wheel tire;

FIG. 3 is a view similar to FIG. 2 but taken from the inner face of the vehicle wheel; and FIG. 4 is a detailed section taken on the lines 4—4 of FIG. 3.

Referring more particularly to the drawings, wherein like numerals refer to like parts, the assembly illustrated includes a frame 8 formed of opposed diverging dog leg arms 10 and 12 which are adapted to straddle the vehicle wheel axle as indicated in FIG. 3. The arms 10 and 12 have inwardly extending leg extremities 14 and 16, respectively, each provided with parallel elongated slots for the pivotal support of cross bar chains as will hereinafter be described.

While the arms 10 and 12 may be fixed in the yoke shape or V-shaped position such as shown in FIG. 3, it is preferred that the arms be pivotally connected so that they may be folded or compacted for convenience for storage during nonuse and to facilitate the mounting of said chains upon a vehicle wheel under adverse conditions. To this end, arms 10 and 12 are provided at their connecting end extremities with inwardly extending plate portions 18 and 20, respectively, which are hingedly connected by a pivot pin 22. The plate portions 18 and 20 may be formed of pairs of parallel plates riveted or welded to the arms 10 and 12, respectively, with the plates of portion 18 formed toward each other so as to mate between the plates of the portion 20. A fixed stud 24 against which the plates of portion 18 abut limits the relative pivotal movement of the arms 10 and 12 to the outspread position shown in FIG. 3. As will also be apparents from FIGS. 1 and 3, the plates 18 and 20 have elongated slots for the pivotal support of cross bar chains.

For the outer face of the vehicle wheel there is provided a harness or side bar chain, as indicated at 26, composed of a relatively short chain section 28 and a relatively long chain section 30. The anti-skid or cross bar chains 32, 34 and 36, as shown, are secured between the harness 26 and the frame 8 to pass over peripheral portions of the vehicle wheel tire indicated at T.

Cross bar chains 32 and 34 are designed to be permanently secured between the leg 16 and the connecting portions 18 and 20, respectively, of the frame member 8 and the end portions of the chains 28 and 30. In contrast, however, the cross bar chain 36 secured to the leg 14 is free and carries at its free end a buckle or plate 38 having a series of spaced slots 40 for selective adjustment and engagement with a locking lever 42 carried intermediate the length of the relatively long harness chain 30.

The utility of the arrangement of parts as herein illustrated and described will be apparent from the operation of the assembly as follows. The frame 8 is preferably grasped by the arm 12 with the operator's hand nearest the rear of the vehicle and the side bar chain 26 is at the same time grasped at the point where chain section 28 intersects with cross bar chain 32. Arm 10 of frame 8 is then thrust by the operator under the vehicle toward the inner face of the vehicle wheel at one side thereof in a substantially horizontal position. The free cross bar chain 36 carried by leg 14 is then with a throwing motion of the operator's wrist flung transversely of the inner face of the wheel to its opposite side at which time the frame 8 is tilted to a vertical position and pushed toward the front of the vehicle along the inner face of the vehicle wheel while the hand holding chain 28 where it intersects wtih cross bar chain 32 simultaneously pulls cross bar chain 32 over the periphery of the tire T so as to position cross chains 32 and 34 in their final position on the wheel and so as to position harness 26 at the outer face of the wheel. The free cross chain 36 is then pulled over the adjacent peripheral portion of the tire while the locking lever 42 intermediate the length of harness chain 30 is pulled toward plate 38 and then locked in one of the slots 40. It will be apparent that at all times the operator's hands remain close to the outer face of the vehicle wheel while the cross chain 32 is elevated over the periphery of the tire and cross chains 34 and 36 are pulled over their adjacent peripheral portions all to be locked in equi-distant spaced relationship by the plate carried at the free end of cross chain 36 and the latch carried intermediate the length of the elongated harness chain 30. It will also be apparent that during the attaching operation the vehicle wheel is not rolled or elevated nor is the chassis of the vehicle elevated nor are the operator's hands necessarily extended inwardly or around the vehicle tire.

It is to be understood that the present invention is not confined to the particular construction herein illustrated and described but embraces all such modifications as come within the scope of the following claims.

We claim:

1. A vehicle wheel tire chain assembly which comprises, connected diverging arms forming a frame member adapted to straddle the axle at the inner face of the vehicle wheel, cross bar chains attached to the diverged extremities and to the connected portions of said arms, the said cross bar chains being adapted to pass over the periphery of the vehicle wheel tire, a harness for the outer face of the vehicle wheel, the cross bar chains at the connected portions of said arms and at the extremity of one of said arms being attached to said harness, the cross bar chain at the extremity of another of said arms being free whereby said free cross bar chain is adapted to be passed transversely of the inner face of the wheel from one side thereof and accessible at the other side thereof from the outer face of the wheel, and means carried by the free end of said free cross bar chain for fastening to said harness whereby to secure the assembly to the vehicle wheel tire.

2. A vehicle wheel tire chain assembly which comprises, connected diverging arms forming a frame member adapted to straddle the axle at the inner face of the vehicle wheel, cross bar chains attached to the diverged extremities and to the connected portions of said arms, the said cross bar chains being adapted to pass over the periphery of the vehicle wheel tire, a chain harness for the outer face of the vehicle wheel, the said harness having a relatively short and a relatively long chain section, the cross bar chains at the connected portions of said arm and at the extremity of one of said arms being attached to the ends of said harness chain sections, the cross bar chain at the extremity of another of said arms being free whereby said free cross bar chain is adapted to be passed transversely of the inner face of the wheel from one side thereof and accessible at the other side thereof from the outer face of the wheel, and coacting latching means carried by the free end of said free cross bar chain and by said relatively long harness chain section intermediate its length for securing the assembly to the vehicle wheel tire.

3. A vehicle wheel tire chain assembly which comprises, a frame member for the inner face of the vehicle wheel, a harness for the outer face of the vehicle wheel, a plurality of cross bar chains connected between said frame and harness and adapted to pass over the periphery of the vehicle wheel tire, a free cross bar chain connected to said frame and having a free end, and means carried at the free end of said free cross bar chain for fastening to said harness whereby to secure the assembly to the vehicle wheel tire.

4. A vehicle wheel tire chain assembly which comprises, a frame member for the inner face of the vehicle wheel, the said frame member being formed of connected diverging substantially straight arms adapted to straddle the axle at the inner face of the vehicle wheel, angular inwardly extending legs at the diverged extremities of said arms and angular inwardly extending connecting portions at the connected extremities of said arms, the said angular legs and connecting portions being provided with slots extending parallel to the length thereof, a harness for the outer face of the vehicle wheel, a plurality of cross bar chains connected between selected of said slots and said harness and adapted to pass over the periphery of the vehicle wheel tire, a free cross bar chain connected to the slots of one of the legs of said frame and having a free end, and means carried at the free end of said free cross bar chain for fastening to said harness whereby to secure the assembly to the vehicle wheel tire.

5. A vehicle wheel tire chain assembly which comprises, a frame member for the inner face of the vehicle wheel, a harness for the outer face of the vehicle wheel, the said harness having a relatively short and a relatively long chain section, a plurality of cross bar chains connected between said frame and the ends of said chain sections and adapted to pass over the periphery of the vehicle wheel tire, a free cross bar chain connected to said frame and having a free end, and coacting latching means carried by the free end of said free cross bar chain and by said relatively long harness chain section intermediate its length for securing the assembly to the vehicle wheel tire.

References Cited in the file of this patent
UNITED STATES PATENTS

| | | |
|---|---|---|
| 2,146,453 | Stahl | Feb. 7, 1939 |
| 2,735,472 | Beery | Feb. 21, 1956 |